(12) United States Patent
Beattie, Jr. et al.

(10) Patent No.: US 10,367,706 B2
(45) Date of Patent: Jul. 30, 2019

(54) AUTOMATIC IDENTIFICATION OF SOLUTIONS FOR WEATHER-RELATED NETWORK IMPAIRMENTS

(71) Applicant: AT&T Intellectual Property I, L.P., Atlanta, GA (US)

(72) Inventors: James Gordon Beattie, Jr., Bergenfield, NJ (US); Henry Randolph, Hueytown, AL (US); Roque Rios, III, Middletown, NJ (US); Charles M. Stahulak, Chicago, IL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 297 days.

(21) Appl. No.: 15/357,207

(22) Filed: Nov. 21, 2016

(65) Prior Publication Data

US 2018/0145873 A1    May 24, 2018

(51) Int. Cl.
*G06F 15/173* (2006.01)
*H04L 12/26* (2006.01)
*H04L 12/24* (2006.01)

(52) U.S. Cl.
CPC .......... *H04L 43/08* (2013.01); *H04L 41/0631* (2013.01); *H04L 41/0654* (2013.01); *Y04S 40/166* (2013.01); *Y04S 40/168* (2013.01)

(58) Field of Classification Search
CPC ............................ H04L 41/0631; H04L 43/08
USPC ........................................................ 709/224
See application file for complete search history.

(56) References Cited

U.S. PATENT DOCUMENTS

| 7,013,257 | B1 | 3/2006 | Nolan et al. |
| 7,336,701 | B2 | 2/2008 | Kearney et al. |
| 7,778,183 | B2 * | 8/2010 | Fan ...................... H04Q 3/0079 370/238 |
| 7,925,211 | B2 | 4/2011 | Agarwal et al. |
| 8,265,921 | B2 | 9/2012 | Kim |
| 8,341,106 | B1 * | 12/2012 | Scolnicov .............. G06N 7/005 702/50 |
| 8,619,583 | B2 | 12/2013 | Dunbar |
| 2002/0165944 | A1 * | 11/2002 | Wisner ................ G06F 11/2035 709/220 |

(Continued)

FOREIGN PATENT DOCUMENTS

CA      2416171 A1 *   7/2004    .............. F17D 5/02

*Primary Examiner* — Brian Whipple
*Assistant Examiner* — Hannah S Wang (57) ABSTRACT

A processor may detect an occurrence of a network anomaly from a set of network operational data collected for a portion of a communication network within a geographic area, detect an occurrence of a weather event from a set of weather data for the geographic area, and determine an occurrence of a weather-related network impairment when the occurrence of the network anomaly and the occurrence of the weather event are detected within a time period, and when the network anomaly and the weather event match a signature for the weather-related network impairment. The processor may further receive, within a time window associated with the time period, a fault report associated with a customer premises within the geographic area and provide a notification and an instruction set to resolve the weather-related network impairment, where the instruction set is stored in a solution record associated with the signature.

20 Claims, 4 Drawing Sheets (56) References Cited

U.S. PATENT DOCUMENTS

| | | | |
|---|---|---|---|
| 2011/0289440 A1* | 11/2011 | Carter | G06F 11/3688 715/771 |
| 2013/0159552 A1* | 6/2013 | Xiang | H04L 69/40 709/246 |
| 2013/0173322 A1* | 7/2013 | Gray | G06Q 50/06 705/7.13 |
| 2014/0164585 A1* | 6/2014 | Shaw | H04L 41/5025 709/223 |
| 2015/0362319 A1 | 12/2015 | Friedlander et al. | |
| 2016/0080922 A1 | 3/2016 | Grube | |
| 2016/0105255 A1 | 4/2016 | Henry et al. | |
| 2016/0182161 A1 | 6/2016 | Barzegar et al. | |

* cited by examiner

AUTOMATIC IDENTIFICATION OF SOLUTIONS FOR WEATHER-RELATED NETWORK IMPAIRMENTS

The present disclosure relates generally to identifying and addressing network impairments, and more particularly to devices, non-transitory computer-readable media, and methods for providing instructions to resolve weather-related network impairments.

BACKGROUND

Technicians and care agents of a telecommunication network may address customer complaints based on the assumption that a resolution is solely specific to the customer. However, in many cases the underlying issue is not due to a customer-specific fault, but is shared across various customers or other users of shared network resources in the network or service platform. In addition, technicians with the wrong skill sets, tools and/or time availability may dispatched repeatedly to one or more customers or network service points, with no effective improvements. The technicians may also feel obligated to "do something" and may replace components in order to be able to use a certain trouble cause and clearance code set to demonstrate to the customers that some actions were taken. Furthermore, some components are either wasted, due to unnecessary replacement, or are unnecessarily reconditioned for placement back into the supply chain, even though such reconditioning procedures are not necessary because the components were still in good working order in the first place.

SUMMARY

In one embodiment, the present disclosure describes a device, computer-readable medium and method for providing an instruction set to resolve a weather-related network impairment. For instance, in one example, a processor may detect a first occurrence of a network anomaly from a first set of network operational data collected for a portion of a communication network within a first geographic area and for a first time period, detect a first occurrence of a weather event from a first set of weather data for the first geographic area and for the first time period, and determine a first occurrence of a weather-related network impairment when the first occurrence of the network anomaly and the first occurrence of the weather event are detected within the first time period, and when the network anomaly and the weather event match a signature for the weather-related network impairment. The processor may further receive, within a time window associated with the first time period, a first fault report associated with a first customer premises within the geographic area and provide a notification of the weather-related network impairment and an instruction set to resolve the weather-related network impairment, where the instruction set is stored in a solution record associated with the signature for the weather-related network impairment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

Examples of the present disclosure automatically build signatures to detect weather-related network impairments in a communication network from network operational data collected from the communication network and weather data collected from a third-party. In addition, examples of the present disclosure detect further occurrence of weather-related network impairments based upon signature matches from additional network operational data and weather data. Examples of the present disclosure also create and store instruction sets to solve the weather-related network impairments, and provide the instruction sets in connection with personnel dispatches to address fault reports associated with customer premises, as well as neighbors or other users of a shared network component or service platform. Furthermore, the continuous evaluation of network operational data and weather data allows for the reduction of ineffective dispatches and the enhancement of the effectiveness of such dispatches. These and other aspects of the present disclosure are described in greater detail below in connection with the examples of FIGS. 1-4.

Figure 1:
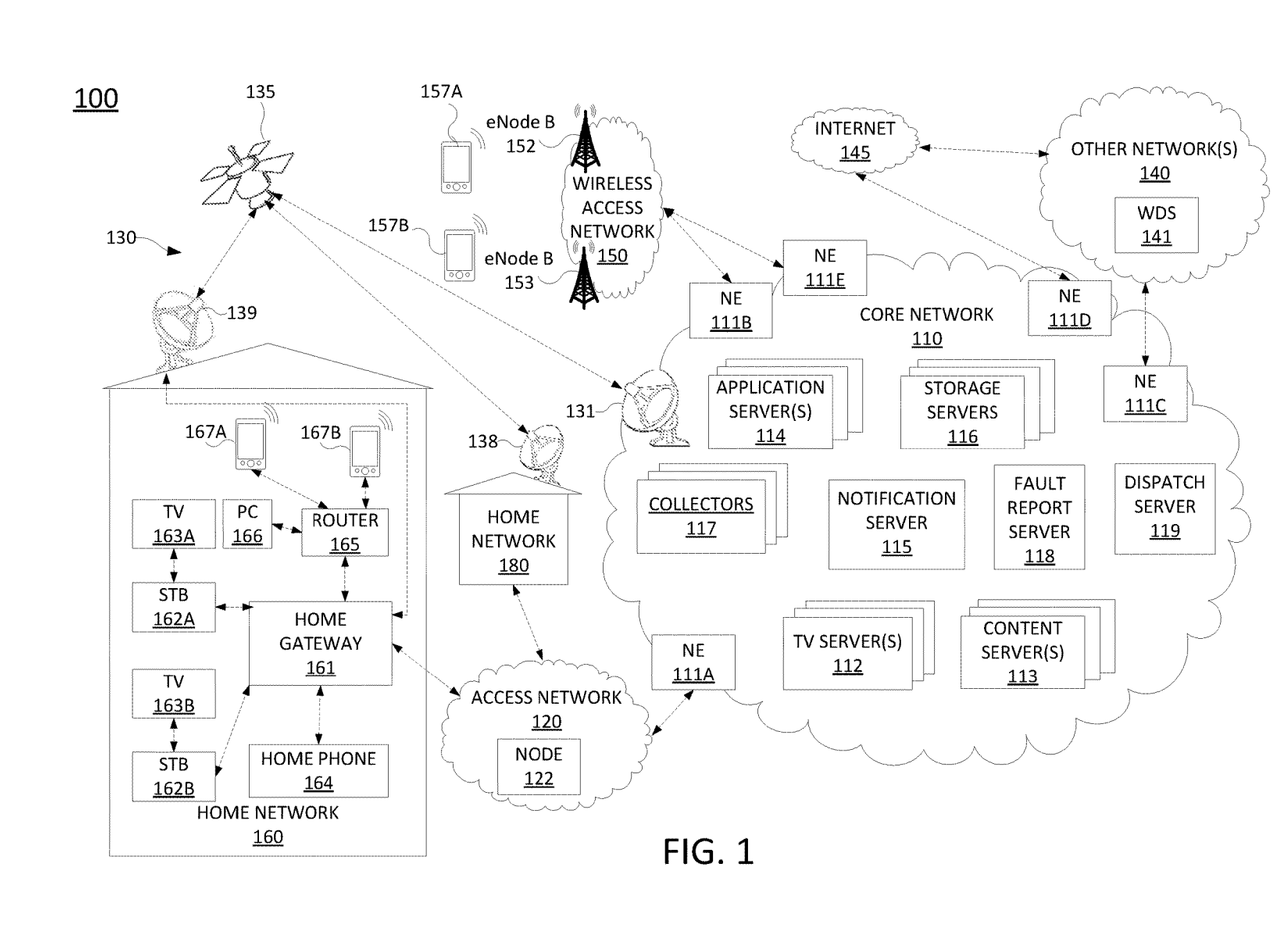
FIG. 1 illustrates an example network related to the present disclosure.

To better understand the present disclosure, FIG. 1 illustrates an example network 100, related to the present disclosure. As shown in FIG. 1, the network 100 connects mobile devices 157A, 157B, 167A and 167B, and home network devices such as home gateway 161, set-top boxes (STBs) 162A, and 162B, television (TV) 163A and 163B, home phone 164, router 165, personal computer (PC) 166, and so forth, with one another and with various other devices via a core network 110, a wireless access network 150 (e.g., a cellular network), an access network 120, other networks 140 and/or Internet 145.

In one embodiment, wireless access network 150 comprises a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, wireless access network 150 may comprise an access network in accordance with any "second generation" (2G), "third generation" (3G), "fourth generation" (4G), Long Term Evolution (LTE) or any other yet to be developed future wireless/cellular network technology. While the present disclosure is not limited to any particular type of wireless access network, in the illustrative embodiment, wireless access network 150 is shown as an evolved UMTS terrestrial radio access network (eUTRAN) subsystem. Thus, elements 152 and 153 may each comprise an evolved Node B (eNodeB).

In one embodiment, each of mobile devices 157A, 157B, 167A, and 167B may comprise any subscriber/customer endpoint device configured for wireless communication such as a personal computer, a laptop computer, a Wi-Fi device, a Personal Digital Assistant (PDA), a mobile phone, a smartphone, a smart television, or smart TV, an email device, a computing tablet, a messaging device, and the like. In one embodiment, any one or more of mobile devices 157A, 157B, 167A, and 167B may have both cellular and non-cellular access capabilities and may further have wired communication and networking capabilities.

As illustrated in FIG. 1, network 100 includes a core network 110. In one example, core network 110 may combine core network components of a cellular network with components of a triple play service network; where triple-play services include telephone services, Internet services and television services to subscribers. For example, core network 110 may functionally comprise a fixed mobile convergence (FMC) network, e.g., an IP Multimedia Subsystem (IMS) network. In one example, core network 110 may comprise an evolved packet core (EPC), e.g., an LTE cellular core network. In addition, core network 110 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 110 may also further comprise a broadcast television network, e.g., a traditional cable provider network or an Internet Protocol Television (IPTV) network, as well as an Internet Service Provider (ISP)) network.

The network elements (NE) 111A-111E may serve as gateway servers or edge routers to interconnect the core network 110 with other networks 140, Internet 145, wireless access network 150, access network 120, and so forth. For example, NEs 111B and 111E may comprise a serving gateway (SGW) and a mobility management entity (MME) respectively, NEs 111C and 111D may each comprise a packet data network gateway (PDN GW), and so forth. Alternatively, or in addition, NEs 111A-111E may comprise provider edge routers (PE), firewalls, and the like. As shown in FIG. 1, core network 110 may also include television (TV) servers 112, content servers 113, application servers 114, a notification server 115 (e.g., an additional application server), storage servers 116, collectors 117, a fault report server 118, and a dispatch server 119. For ease of illustration, various additional elements of core network 110 are omitted from FIG. 1.

With respect to television service provider functions, core network 110 may include one or more television servers 112 for the delivery of television content, e.g., a broadcast server, a cable head-end, a video-on-demand (VoD) server, and so forth. For example, core network 110 may comprise a video super hub office, a video hub office and/or a service office/central office. In this regard, television servers 112 may interact with content servers 113 to select which television content to provide to the home networks 160 and 180, and others. In one example, content servers 113 may store scheduled national television broadcast content for a number of television channels, video-on-demand programming, local programming content, and so forth. For example, the core network 110 may gather television content from various content providers to be distributed to various subscribers.

In addition, the access network 120 may comprise a Digital Subscriber Line (DSL) network, a broadband cable access network, a Local Area Network (LAN), a cellular or wireless access network, a 3$^{rd}$ party network, and the like. For example, the operator of core network 110 may provide a cable television service, an IPTV service, or any other type of television service to subscribers via access network 120. In this regard, access network 120 may include a node 122, e.g., a mini-fiber node (MFN), a video-ready access device (VRAD), or the like to process television content from television servers 112 via network element 111A. However, in another embodiment node 122 may be omitted, e.g., for fiber-to-the-premises (FTTP) installations. Access network 120 may also transmit and receive communications between home network 160 and core network 110, and between home network 180 and core network 110 relating to voice telephone calls, communications with web servers via the Internet 145 and/or other networks 140, and so forth.

Alternatively, or in addition, the network 100 may provide television services to home networks 160 and 180 via a satellite broadcast network 130, e.g., comprising at least ground station 131 and satellite 135. For instance, ground station 131 may receive television content from television servers 112 for transmission to satellite 135. Accordingly, satellite 135 may receive television content from ground station 131 and may broadcast the television content to satellite receivers 138 and 139, e.g., satellite link terrestrial antennas (including satellite dishes and antennas for downlink communications, or for both downlink and uplink communications), as well as to satellite receivers of other subscribers within a coverage area of satellite 135. In one example, satellite network 130 may be controlled and/or operated by a same network service provider as core network 110. In another example, satellite network 130 may be controlled and/or operated by a different entity and may carry television broadcast signals on behalf of core network 110.

In one example, home network 160, e.g., a customer premises, may include a home gateway 161, which receives data/communications associated with different types of media, e.g., television, phone, and Internet, and separates these communications for the appropriate devices. The data/communications may be received via access network 120 and/or via satellite receiver 139, for instance. In one example, television data is forwarded to set-top boxes (STBs) 162A and 162B to be decoded and forwarded to televisions 163A, and 163B for presentation. Similarly, telephone data is sent to and received from home phone 164. Internet communications are sent to and received from router 165, which may be capable of both wired and/or wireless communication. In turn, router 165 receives data from and sends data to the appropriate devices, e.g., personal computer (PC) 166, mobile devices 167A, and 167B, and so forth. In one example, router 165 may further communicate with TV (broadly a display) 163A and/or 163B, e.g., where one or both of the televisions may comprise a smart TV. For ease of illustration, components of home network 180 are omitted from FIG. 1. However, it should be understood that home network may include similar components as described above in connection with home network 160. In addition, although the example of FIG. 1 illustrates customer premises comprising home networks 160 and 180, it should be understood that network 100 may include additional customer premises comprising business and enterprise networks, networks of educational institutions, governmental entities, and so forth.

As illustrated in FIG. 1, core network 110 may include various application servers 114. For instance, application servers 114 may be implemented to provide certain functions or features, e.g., a Serving-Call Session Control Function (S-CSCF), a Proxy-Call Session Control Function (P-CSCF), or an Interrogating-Call Session Control Function (I-CSCF), one or more billing servers for billing one or more services, including cellular data and telephony services, wire-line phone services, Internet access services, and television services. Application servers 114 may also include a Home Subscriber Server/Home Location Register (HSS/HLR) for tracking cellular subscriber device location and other functions. An HSS refers to a network element residing in the control plane of an IMS network that acts as a central repository of all customer specific authorizations, service profiles, preferences, etc. Application servers 114 may also include an IMS media server (MS) for handling and terminating media streams to provide services such as announcements, bridges, and Interactive Voice Response (IVR) messages for VoIP and cellular service applications. The MS may also interact with customers for media session management. In addition, application servers 114 may also include a presence server, e.g., for detecting a presence of a user. For example, the presence server may determine the physical location of a user or whether the user is "present" for the purpose of a subscribed service, e.g., online for a chatting service and the like. Application servers 114 may further include business information database (BID) storage servers. For instance, the network operator of core network 110 may receive and store third-party information relating to subscribers. Application servers 114 may further include: a billing system, a customer relationship management (CRM) system, an inventory system (IS), an ordering system, an enterprise reporting system (ERS), an account object (AO) database system, and so forth. It should be noted that the foregoing are only several examples of the types of relevant application servers 114 that may be included in core network 110.

In one example, core network 110 further includes a fault report server 118, e.g., a trouble ticket system, to generate fault reports (or trouble tickets) when customer inquiries or complaints are received, e.g., via telephone calls, emails or other web-based communications, such as submission of a form or questionnaire via a webpage of the network service provider accessible via fault report server 118 or another server or device associated with the network service provider. Alternatively, or in addition, a network service provider of core network 110 may configure fault report server 118 to automatically generate fault reports when certain conditions are detected from network operational data gathered via collectors 117, described in greater detail below, such as failure alarms for particular network elements, customer premises, etc. In some cases, the generating of a fault report may also result in the generating of a work order or dispatch notice via dispatch server 119. For instance, if the fault report relates to an issue that is not resolvable automatically, it may call for assigning a work order and dispatching a network technician to a customer site or to another location of the network 100 to physically address the underlying issues, e.g., by replacing, resetting, or manually configuring and/or reconfiguring one or more components, assigning a work order to a customer care agent or the like to remotely change various settings with respect to a customer's account, service, or equipment, and so forth.

In one example, a resolution may be recorded with respect to a fault report and/or a work order. For instance, a network technician may confirm the nature of the problem underlying the fault report and how the problem was resolved by completing and submitting a form to the fault report server 118 or dispatch server 119 to close the work order and/or the fault report. For instance, a customer may call to complain of a complete loss of service and demand that the network service provider restore service. A fault report may be generated in response to the customer inquiry, and a work order may be generated for a network technician to be dispatched to the customer site. After investigating, the network technician may confirm that a mini-fiber-node (MFN) in a particular neighborhood was flooded during a storm and that one or more components needed to be replaced. The network technician may then close the work order and/or the fault report and report the solution in a follow up form. In other cases, fault reports and work orders may be closed when it is determined that an underlying network impairment has been resolved. For instance, additional customers in the same neighborhood may call with similar complaints, and a number of similar fault reports and work orders may be created. However, when one or more technicians are deployed in accordance with the additional work orders, the technician(s) may find that the underlying issue (e.g., the flooded MFN) has already be fixed. In one example, the nature of the underlying problems for fault reports may broadly be categorized as a network impairments, e.g., for all issues that involve positive effort to resolve, and "others," such as erroneous reports, temporary conditions which are resolved on their own, and so forth. In one example, information regarding confirmed network impairments, including the nature of the network impairment, the time frame, and the location may be stored in a network impairment record. For instance, fault report server 118 and/or dispatch server 119 may generate network impairment records and upload/store the network impairment records in one or more of storage servers 116. In one example, the fault report server 118 may send a notification of a fault report to notification server 115 to determine whether the notification server 115 will identify a weather-related network impairment and provide an instruction set. If the notification server 115 does respond with such information, the fault report server 118 may provide the information to the dispatch server 119 to place in a work order for the network technician. Further details regarding this aspect of the present disclosure are discussed in greater detail below.

In one example, the core network 110 may include data storage servers 116 to receive and store third-party information, e.g., weather data regarding weather events, to receive and store network operational data collected from various network elements within the network 100, and to receive and store network impairment records, e.g., received from fault report server 118 and/or dispatch server 119. In one example, the storage servers 116 may represent a distributed file system, e.g., a Hadoop® Distributed File System (HDFS™), or the like. For instance, storage servers 116 may receive weather data from a device of a third-party, e.g., from weather data server (WDS) 141 via the Internet 145, other networks 140, etc. The third party may comprise, for example, the National Oceanic and Atmospheric Administration (NOAA), the National Weather Service (NWS), the Space Weather Prediction Center (SWPC), or the like. In one example, the weather data may be received via a weather service data feed, e.g., an NWS extensible markup language (XML) data feed, or the like. In another example, the weather data may be obtained by retrieving the weather data from WDS 141. For example, WDS 141 may store Advanced Composition Explorer (ACE) satellite data, SWPC solar and geophysical event reports, and so forth. In one example, the storage servers 116 may receive and store weather data from multiple third-parties. In one example, the weather data may include: precipitation data, humidity data, wind speed data, cloud cover data, dew point data, particulate matter data, temperature data, or solar event data, e.g., measurements, readings, warnings, or the like which relate to geomagnetic storms, solar flares, etc. In one example, the weather data may include information that relates to weather events, such as rainstorms, thunderstorms, tropical storms, hurricanes, tornadoes, floods, and so forth. In one example, the weather events may be determinable from the weather data. For instance, an occurrence of a snowstorm in a given region may be determined when the weather data indicates snow accumulation of two inches within a two hour period. Alternatively, or in addition, the weather events may be explicitly indicated in the weather data. For example, the weather data may include warnings, alerts, notifications, etc. regarding specific weather events for specific geographic areas and timeframes. In one example, the weather data may include past and/or real-time measurements, as opposed to forecast information.

In one example, the network 100 may include one or more collectors 117 in core network 110. In one example, the collectors 117 may each comprise a computing system, such as a computing system 400 depicted in FIG. 4, configured to collect network operational data (broadly "data records") of the network 100 from various data sources, e.g., various network elements of the network 100, and to forward the network operational data to storage servers 116, fault report server 118, and/or notification server 115. For instance, collectors 117 may include network probes to gather network operational data from various components within core network 110, access network 120, and/or wireless access network 150, and/or to perform other operations in accordance with the present disclosure. For example, the collectors 117 may interface with various elements such as TV servers 112, content servers 113 NEs 111A-111E, application servers 114, and other components such as MMEs, SGWs, an HSS, a PDN GW, eNodeBs, a (P-CSCF), a serving call session control function (S-CSCF), a billing and traffic (B&T) server, an ENUM (tElephone NUmbering Mapping) server, a domain name service (DNS) server, and other components (not shown). Collectors 117 may collect network operational data from the various network elements, such as: control plane signaling and/or session management messages, data traffic volume records, call detail records (CDRs), error reports, performance logs, alarm data, and other information and statistics, which may then be compiled and processed, e.g., normalized, transformed, tagged, etc., and forwarded to storage servers 116, fault report server 118, and/or notification server 115. In one example, the various network elements may forward the network operational data to one or more of collectors 117 on a periodic basis, e.g., when a certain quantity of network operational data has been collected and is ready to transmit, etc. Alternatively, or in addition, the collectors 117 may query the network elements, e.g., periodically or on some other basis, in order to retrieve the network operational data. The network operational data that is collected may be stored in storage servers 116 and used for various purposes, including network troubleshooting/monitoring, network optimization, network planning, network capacity management, marketing, sales, business strategy, claims, etc.

The control plane signaling and/or session management messages may relate to communications traversing core network 110 for endpoint devices 157A, 157B, 167A, and 167B, or for other endpoint devices/UEs, communications for home phone 164, PC 166, STB 162A, STB 162B, and so on, internal communications between components within core network 110, access network 120, wireless access network 150, satellite network 130, etc., communications from external devices, such as WDS 141 to components within core network 110, and so forth. The CDRs may be collected from a billing system (e.g., implemented as one or more of application servers 114) and may include various fields, such as: a cause code, a calling party area code, a calling party phone number, a called party area code, a called party phone number, a date of a call, a time stamp for the start of a call, a time stamp for the end of a call, a time duration of a call, a type of call, a disposition of a call, and so forth. Error reports and performance logs may include records that indicate statuses of various aspects of different components, such as statuses of ports or interfaces, processor or memory utilization levels, link utilization levels, call logs that indicated completed calls, dropped calls, etc., notifications from a network element to other network elements regarding various issues, such as an overload condition, a power source failure, an impending power off event, and so on.

The network operational data that is gathered by collectors 117 may be processed by collectors 117, storage servers 116, fault report server 118, and/or notification server 115 to generate additional network operational data such as cell-level records comprising a number of key performance indicators (KPIs) for a cell within a given time period, such as: the number of endpoint devices of each of a plurality of endpoint device types that is serviced by the cell site, the number of session setups at the cell site for the endpoint devices of each of the plurality of endpoint device types, the number of inter-cell handoffs at the cell site for the endpoint devices of each of the plurality of endpoint device type, and so forth, aggregate records relating to home network services by access network 120 and/or node 122, and so forth.

As illustrated in FIG. 1, the core network 110 also includes a notification server 115. In one example, the notification server 115 may comprise a computing system or server, such as computing system 400 depicted in FIG. 4, and may be configured to provide one or more operations or functions for determining an instruction set to resolve a weather-related network impairment and/or for providing an instruction set to resolve a weather-related network impairment, as described herein. For example, the notification server 115 may be configured to perform functions such as those described below in connection with the example method 200 of FIG. 2 and/or method 300 of FIG. 3. Accordingly, the notification server 115 may be connected directly or indirectly to any one or more network elements of core network 110, and of the network 100 in general, that are configured to gather and forward network operational data to notification server 115 and/or to receive instructions from notification server 115. Due to the relatively large number of connections available between notification server 115 and other network elements, none of the actual links to the notification server 115 are shown in FIG. 1. In addition, it should be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

In one embodiment, the notification server 115 may retrieve and analyze weather data and network operational data from storage servers 116. For example, the notification server 115 may extract from the network operational data, various data indicating: lack of connectivity, intermittent outages, power cycle events for network equipment, throughput, e.g., of a network device, node, link, trunk, trunk group, etc., packet loss ratios, signal to noise ratios (SNRs), signal to interference and noise ratios (SINRs), a number of timeout events, a load level for a device, a link, a processor, a port, and so forth. In one example, the notification server 115 may establish baselines for different types of network operational data, such as a an average link utilization level, an average SNR, an average CPU utilization, an average packet loss ratio at a device, or on a link, and so on. Notification server 115 may then determine anomalies in the network operational data. For instance, various thresholds may be set for determining a network anomaly, such as a deviation of a type of network operational data from a baseline level or measurement by a threshold amount or percentage. For instance, an anomaly may comprise a link utilization level exceeding 30 percent of the baseline link utilization level, an increase in a signal-to-noise ratio exceeding 15 percent of the baseline, a measured value exceeding a baseline by three standard deviations, five standard deviations, 10 standard deviations, and so on. In any case, when one or more thresholds for the various types of network operational data are exceeded, the notification server 115 may determine that a network anomaly has occurred. In one example, the occurrences of network anomalies may be determined with respect to particular time periods and particular geographic areas, such as a particular customer premises, a neighborhood, a town, a county, a state, or other geographic region.

It should be noted that in some cases, information contained in the network operational data and information contained in network impairment records gathered via fault report server 118 and dispatch server 119 may overlap in some cases. For instance, network operational data may indicate a failed switch in the network, while a network impairment record may also identify that a failed switch was an underlying cause associated with a fault report. However, for purposes of the present disclosure the network impairment records comprise details which are not included in the network operational data. For instance, a network impairment record may indicate that a network impairment comprises a failed switch caused by a loss of power from a power source, whereas the network operational data may simply reveal that a number of failed communication requests to the switch exceeds a threshold.

In one example, the notification sever 115 may further establish baselines for different types of weather data, such as an average rainfall per day for a particular geographic area, an average peak daily temperature or an average lowest daily temperature for a particular geographic area, and so forth. In one example, the notification server 115 may also determine weather events when there is a deviation of a particular type of weather data from a relevant baseline value by a threshold amount or percentage. For instance, a weather event may be determined when an average peak daily temperature in a given area is 85 degrees in the month of August and the weather data indicates for a particular hour, day, etc., that the temperature is in excess of 105 degrees.

In one example, notification server 115 may correlate occurrences of weather events from the weather data stored in storage servers 116 with the occurrences of network anomalies that are determined from the network operational data. In particular, an occurrence of a weather event may be correlated with a network anomaly when the weather event is associated with the same time period and the same geographic area as the network anomaly. In one example, the notification server 115 may further determine that the occurrence of the network anomaly and the occurrence of the weather event are associated with an occurrence of a weather-related network impairment. For example, the notification server 115 may obtain network impairment data from network impairment records generated by fault report server 118 and/or dispatch server 119 and stored in one or more of storage servers 116. In one example, the occurrence of a network anomaly and the occurrence of a weather event are associated with the occurrence of a weather-related network impairment when all three coincide with respect to a same time period and a same geographic area. Upon such a determination, the network impairment may be referred to as a "weather-related network impairment". As just one example, and in reference to the network 100 of FIG. 1, a network anomaly may comprise an abnormal number of timeout events, e.g., with respect to heartbeat messages sent by a network element to home gateway 161, while the network impairment may comprise an outage of the node 122 in the path between TV servers 112 in core network 110 and the home gateway 161. In one example, the network anomaly and the weather event may be associated, or correlated with one another and with the (weather-related) network impairment when a number of instances where an occurrence of the network anomaly, an occurrence of the weather event, and an occurrence of the (weather-related) network impairment pertaining to a same geographic area and a same time period exceeds a threshold number of instances, e.g., three instances, five instances, ten instances, etc. However, in one example, the threshold may be at least one instance.

In one example, notification server 115 may create and store a solution record for the weather-related network impairment when it is determined that the network anomaly, the weather event, and the weather-related network impairment are associated with the same time period and geographic area. For example, as mentioned above, a network technician may confirm the nature of a problem underlying a fault report and how the problem was resolved by completing and submitting a form to the fault report server 118 and/or dispatch server 119 to close the work order and/or the fault report. Accordingly, the information regarding how the problem was resolved may be stored as an instruction set comprising at least one instruction to resolve the weather-related network impairment as part of the network impairment record that may be stored in storage servers 116. The notification server 115 may further store in the solution record a signature for the weather-related network impairment comprising the deviation from the baseline for the network operational data and the deviation from the baseline for the weather data. In addition, notification server 115 may store the solution record in one or more of storage servers 116.

Recommendation server 115 may further continue to access and process network operational data and weather data to discover correlations in time and geographic area with respect to network anomalies and weather events. In addition, when a network anomaly and a weather event are correlated, the recommendation server 115 may further determine whether the network anomaly-weather event pair matches a signature for a weather-related network impairment. When a match is detected and when a fault report is received from fault report server 118 with respect to the geographic area associated with the network anomaly and the weather event, and which falls within a time frame associated with the time period of the network anomaly and the weather event, the recommendation server 115 may retrieve the solution record for the weather-related network impairment from storage servers 116 and may provide the instruction set to resolve the weather-related network impairment. For example, it may be assumed that the network anomaly is a result of the weather-related network impairment and that the weather-related network impairment was caused by or otherwise associated with the weather event. The instruction set may be provided to a network technician in a work order, for example, or may be provided to one or more network devices which may automatically address the weather-related network impairment. For instance, an element management system (EMS) may communicate with network elements using a remote management module (RMM) to configure and reconfigure network elements.

In one example, the network technician or the network device assigned to handle the fault report and/or the work order may further confirm the nature of the underlying problem and how the problem is resolved by completing and submitting a form to the trouble ticket system or dispatch system to close the work order or trouble ticket. Accordingly, the information regarding as to how the problem is resolved may be used to refine the solution record for the weather-related network impairment. For example, a confidence score may be provided in conjunction with the instruction set each time the instruction set is provided in connection with a work order. For instance, as mentioned above, in one example the network anomaly and the weather event may be associated with one another and with the weather-related network impairment when a number of instances where an occurrence of the network anomaly, an occurrence of the weather event, and an occurrence of the weather-related network impairment pertaining to a same geographic area and a same time period exceeds a threshold number of instances. In addition, each time a form is submitted to close a fault report or work order and the information regarding how the problem was resolved indicates that the network impairment was caused by or otherwise associated with the weather event, a confidence score related to the solution record may be increased. For example, the network technician may confirm whether or not the instruction set provided in the work order was useful to address the underlying problem. On the other hand, if the form indicates that the network impairment was not caused by or otherwise associated with the weather event and/or called for a solution different from that provided by the instruction set, the confidence score may be decreased.

Further details regarding the functions that may be implemented by recommendation server 115 are discussed in greater detail below in connection with the example method 200 of FIG. 2 and the example method 300 of FIG. 3.

In addition, those skilled in the art will realize that the network 100 may be implemented in a different form than that illustrated in FIG. 1, or may be expanded by including additional endpoint devices, access networks, network elements, application servers, etc. without altering the scope of the present disclosure. For example, the network 100 may be expanded to include additional networks, such as network operations center (NOC) networks, additional eUTRANs, and so forth. The network 100 may also be expanded to include additional network elements such as border elements, routers, switches, policy servers, security devices, gateways, a content distribution network (CDN) and the like, without altering the scope of the present disclosure. In addition, network 100 may be altered to omit various elements, substitute elements for devices that perform the same or similar functions, combine elements that are illustrated as separate devices, and/or implement network elements as functions that are spread across several devices that operate collectively as the respective network elements.

In addition, although aspects of the present disclosure have been discussed above in the context of several network technologies, examples of the present disclosure are not so limited. For example, the teachings of the present disclosure can be applied to various types of cellular networks (e.g., a 2G network, a 3G network, and the like, or a future technology or standard-based network), various types of access networks, various types of core networks, and so forth. For instance, core network 110 is not limited to an IMS network configuration for cellular core network services, an IP/MPLS network configuration for VoIP telephony services, or any particular type of broadcast television network configuration for providing television services, and so forth. Thus, these and other modifications are all contemplated within the scope of the present disclosure.

Figure 2:
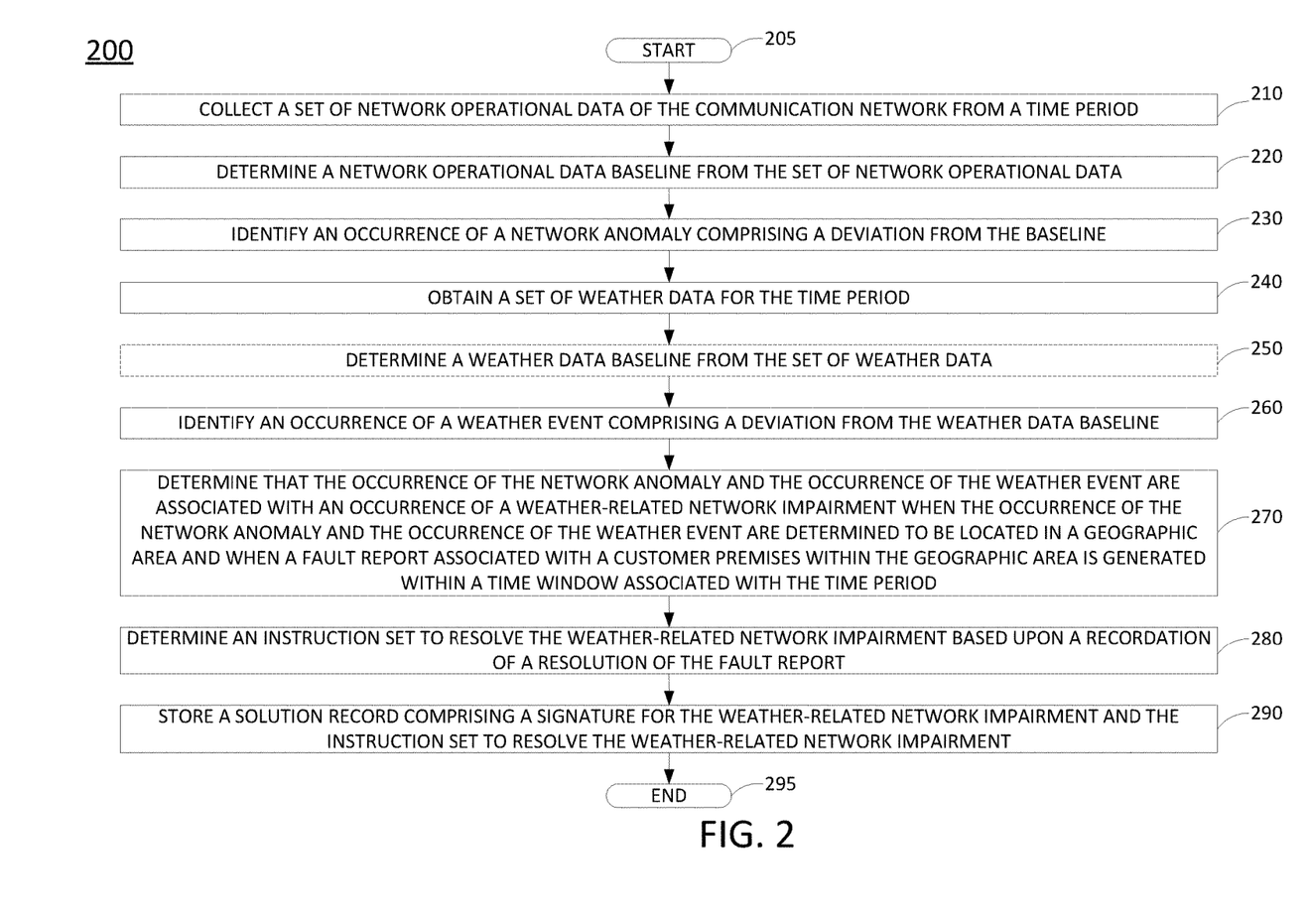
FIG. 2 illustrates a flowchart of an example method for determining an instruction set to resolve a weather-related network impairment, according to the present disclosure.

FIG. 2 illustrates a flowchart of a method 200 for determining an instruction set to resolve a weather-related network impairment. In one example, the method 200 is performed by the notification server 115 of FIG. 1, any one or more components thereof (e.g., a processor performing operations stored in and loaded from a memory), or any one or more other devices in a communication network, such as network 100 of FIG. 1. For instance, the method 200 may be performed by the notification server 115 in conjunction with one or more storage servers 116, collectors 117, fault report server 118, and so forth. In one example, the steps, functions, or operations of method 200 may be performed by a computing device or system 400, and/or processor 402 as described in connection with FIG. 4 below. For instance, the computing device or system 400 may represent any one or more components of FIG. 1 that are configured to perform the steps, functions and/or operations of the method 200. For illustrative purposes, the method 200 is described in greater detail below in connection with an example performed by a processor, such as processor 402. The method 200 begins in step 205 and proceeds to step 210.

At step 210, the processor collects a set of network operational data of the communication network from a time period. The network operational data may include control plane signaling and/or session management messages, data traffic volume records, call detail records (CDRs), error reports, performance logs, alarm data, and other information and statistics gathered from various network elements of a telecommunication network. The time period may comprise a day, a week, a month, a three-month period, a season, a given month over the course of several years, a particular time of day or day of the week over the course of a month, several months, or a year, and so forth. In one example, the network operational data may pertain to a given geographic area, e.g., a neighborhood, a town, a zip code, a county, a state, or other region. For instance, the network operational data pertaining to the geographic area may be extracted from a larger set of network operational data that is collected. In another example, the network operational data that is collected at step 210 may already be localized to the geographic area and exclude network operational data from other regions.

At step 220, the processor determines a network operational data baseline from the set of network operational data. For example, depending upon the type of network operational data, the baseline may comprise a an average link utilization level, an average SNR, an average CPU utilization, an average packet loss ratio at a device, or on a link, and so on. In one example, the processor may determine a plurality of network operational data baselines for different types of network operational data.

At step 230, the processor identifies an occurrence of a network anomaly, where the network anomaly comprises a deviation from the network operational data baseline. For instance, the processor may continue to receive additional network operational data of the communication network, or may continue to process the network operational data collected at step 210. In one example, the deviation from the baseline may comprise a reading or measurement of a type of network operational data that exceeds the baseline by a threshold amount or percentage (e.g., either above or below the baseline, depending upon the type of network operational data). For instance, an anomaly may comprise a link utilization level exceeding 30 percent of the baseline link utilization level, an increase in a signal-to-noise ratio exceeding 15 percent of the baseline, and so forth. In one example, a network anomaly may comprise a plurality of deviations from network operational data baselines for a plurality of different types of network operational data. For instance, a network anomaly may be indicated by a state where there is both an excess packet loss ratio and an excess number of alarms for a satellite link in a given time period. In one example, occurrences of network anomalies may be determined with respect to a particular time frame (e.g., a smaller time period from within the time period from which the network operational data is collected at step 210) and a particular geographic location, such as a particular customer premises, a neighborhood, a town, a county, a state, or other geographic region (e.g., a smaller area or region from within the geographic area for which the network operational data is collected at step 210).

At step 240, the processor obtains a set of weather data for the time period. In one example, the weather data may be received via a weather service data feed, e.g., an NWS XML data feed, or the like. In another example, the weather data may be obtained by retrieving the weather data from a server of a third-party, e.g., a server of NOAA or NWS storing ACE satellite data, SWPC solar and geophysical event reports, and so forth. In one example, the processor may obtain weather data from multiple third-parties. In one example, the weather data may include: precipitation data, humidity data, wind speed data, cloud cover data, dew point data, particulate matter data, temperature data, or solar event data, e.g., measurements, readings, warnings, or the like which relate to geomagnetic storms, solar flares, etc. The weather data may relate to the same geographic area for which the network operational data is collected at step 210, e.g., a geographic location or area in which at least a portion of the communication network infrastructure physically resides. Following step 240, the method 200 may proceed to optional step 250 or to step 260.

At optional step 250, the processor may determine a weather data baseline from the set of weather data. For example, the baseline may comprise an average number of inches of rainfall per day for the geographic area, an average peak daily temperature or an average lowest daily temperature for the geographic area, and so forth.

At step 260, the processor identifies an occurrence of a weather event comprising a deviation from the weather data baseline. The deviation may comprise a reading or measurement of a type of weather data that exceeds the baseline by a threshold amount or percentage (e.g., either above or below the baseline, depending upon the type of weather data). For instance, if the deviation threshold is a 15 percent increase in temperature over an average temperature, a weather event may be determined when an average peak daily temperature in a given area is 85 degrees in the month of August and the weather data indicates for a particular hour, day, etc., that the temperature is in excess of 97.75 degrees. In another example, a weather event may comprise wind speeds in excess of 74 miles per hour (which may be indicative of a hurricane, for instance). In one example, the processor may analyze the weather data received at step 240 to determine the weather data baseline at step 250 and the exceeding of the weather data baseline at step 260. In another example, the weather data baseline may be provided as a standard by a third-party weather service, or by another entity. In still another example, the occurrence of the weather event may be indicated directly in the weather data received at step 240. For example, the one or more third parties supplying the weather data may determine weather events which are obtained by and/or provided to the processor at step 240. In other words, the weather data may comprise identifications of weather events as an alternative to, or in addition to raw weather data measurements, such as temperature readings, humidity readings, measurements of rainfall and other precipitation, and so forth. In one example, the occurrence of the weather event may be identified with respect to a particular geographic area, e.g., a smaller geographic area contained within the geographic area associated with the set of weather data obtained at step 240.

At step 270, the processor determines that the occurrence of the network anomaly and the occurrence of the weather event are associated with an occurrence of a network impairment when the occurrence of the network anomaly and the occurrence of the weather event are determined to be relate to a same geographic area and a same time period, and when a fault report associated with a customer premises within the geographic area is generated within a time window associated with the time period. In one example, the time window may comprise the first time period and/or the first time period plus a duration of time following the first time period, e.g., to account for possible delays between occurrence of network impairments and customer inquiries which may precipitate the generating of fault reports. In one example, the fault report may identify a network impairment that is awaiting a fix or solution. The network impairment may be referred to as a "weather-related network impairment" upon the determination at step 270. In one example, the network anomaly and the weather event may be associated with one another and with the (weather-related) network impairment when a number of instances where an occurrence of the network anomaly, an occurrence of the weather event, and an occurrence of the (weather-related) network impairment pertaining to a same geographic area and a same time period exceeds a threshold number of instances.

At step 280, the processor determines an instruction set to resolve the weather-related network impairment based upon a recordation of a resolution of the fault report. The instruction set may include one or more instructions regarding how to fix or solve the weather-related network impairment. For instance, a network technician dispatched in response to the fault report may confirm the nature of the problem underlying the fault report and how the problem was resolved by completing and submitting a form to close the fault report. Thus, in one example, the instruction set may comprise the network technician's recordation of how the problem was resolved.

At step 290, the processor stores a solution record comprising the signature for the weather-related network impairment and the instruction set to resolve the weather-related network impairment. In one example, the signature comprises the deviation from the network operational data baseline and the deviation from the weather data baseline, e.g., a threshold amount or percentage above or below a respective baseline. In one example, the signature my include deviations from a plurality of network operational data baselines, e.g., where the network anomaly comprise deviations of the plurality of network operational data baselines. Following step 290, the method 200 proceeds to step 295 where the method ends.

Figure 3:
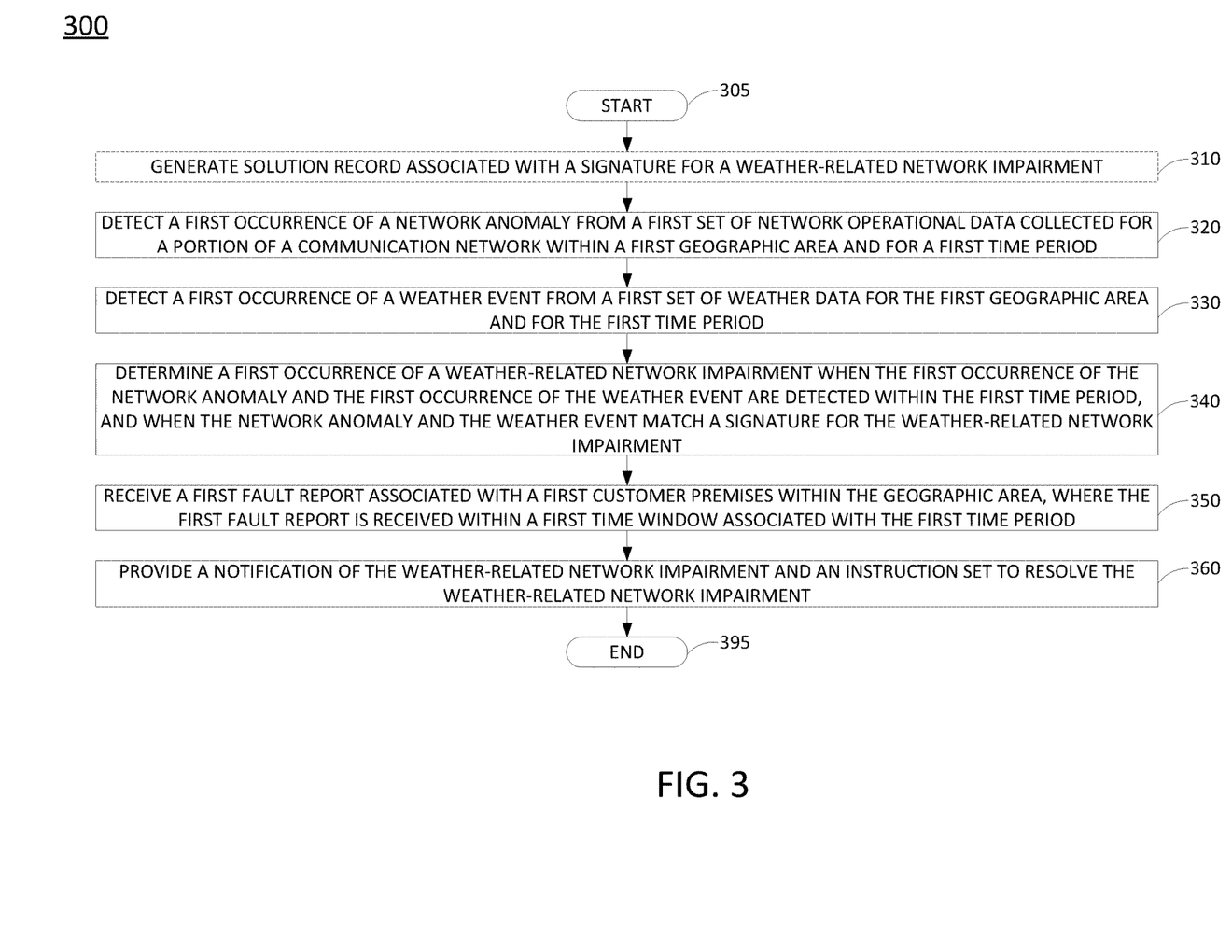
FIG. 3 illustrates a flowchart of an example method for providing an instruction set to resolve a weather-related network impairment, according to the present disclosure.

FIG. 3 illustrates a flowchart of a method 300 for providing an instruction set to resolve a weather-related network impairment. In one example, the method 300 is performed by the notification server 115 of FIG. 1, any one or more components thereof (e.g., a processor performing operations stored in and loaded from a memory), or any one or more other devices in a communication network, such as network 100 of FIG. 1. For instance, the method 300 may be performed by the notification server 115 in conjunction with one or more storage servers 116, collectors 117, fault report server 118, and so forth. In one example, the steps, functions, or operations of method 300 may be performed by a computing device or system 400, and/or processor 402 as described in connection with FIG. 4 below. For instance, the computing device or system 400 may represent any one or more components of FIG. 1 that are configured to perform the steps, functions and/or operations of the method 300. For illustrative purposes, the method 300 is described in greater detail below in connection with an example performed by a processor, such as processor 402. The method 300 begins in step 305 and proceeds to optional step 310 or to step 320.

At optional step 310, the processor may generate a solution record associated with a signature for a weather-related network impairment. For example, the operations of optional step 310 may comprise the same or similar operations as described above in connection with the method 200 of FIG. 2

At step 320, the processor detects a first occurrence of a network anomaly from a first set of network operational data collected for a portion of a communication network within a first geographic area and for a first time period. In one example, the first occurrence of the network anomaly is detected when a deviation from a baseline for the network operational data is discovered in the first set of network operational data. The deviation may comprise, for example, a reading or measurement of a type of network operational data that exceeds a baseline by a threshold amount or percentage (e.g., either above or below the baseline, depending upon the type of network operational data). In one example, step 320 may further include the processor determining the baseline for the network operational data from the first set of network operational data, or from a second set of network operational data which may pertain to the same or a different geographic area, and/or a same or different time period. In one example, the first occurrence of the network anomaly may be determined when a plurality of deviations from network operational data baselines for a plurality of different types of network operational data are discovered in the first set of network operational data.

It should be noted that as referred to in connection with the present method 300, the set of network operational data is labeled as a "first" set of network operational data, the occurrence of the network anomaly is labeled as a "first" occurrence of the network anomaly, the geographic area is labeled as the "first" geographic area, and so forth. However, the label of "first" does not necessarily indicate an occurrence earlier in time, but rather is used to distinguish from other similar items such as a "second" occurrence of a network anomaly (which may be earlier in time than the "first" occurrence of the network anomaly). For example, as part of optional step 310, a second occurrence of a network anomaly may be detected by the processor from a second set of network operational data in connection with a second geographic area and a second time period.

At optional step 330, the processor detects a first occurrence of a weather event from the first set of weather data for the first geographic area and for the first time period. In one example, step 330 may include retrieving or receiving the weather data comprising a notification of the weather event from a device of a third-party, e.g., a server of a weather service, such as NOAA, NWS, or the like. Alternatively, or in addition, step 330 may include analyzing the weather data to determine a deviation from a baseline for a particular type of weather data, e.g., rainfall in excess of three inches for the first time period, peak wind speeds for the first time period in excess of 40 percent of the average for the time of year, and so forth.

At step 340, the processor determines a first occurrence of a weather-related network impairment when the first occurrence of the network anomaly and the first occurrence of the weather event are detected within the first time period, and when the network anomaly and the weather event match a signature for the weather-related network impairment. In one example, the signature comprises the deviation from the network operational data baseline and the deviation from the weather data baseline, e.g., a threshold amount or percentage above or below a respective baseline. In one example, the signature may include deviations from a plurality of network operational data baselines, e.g., where the network anomaly comprises deviations of the plurality of network operational data baselines.

At step 350, the processor receives a first fault report associated with a first customer premises within the geographic area, wherein the first fault report is received within a first time window associated with the first time period. For instance, the first time window may comprise the first time period and/or the first time period plus a duration of time following the first time period. The first fault report may specifically identify the (weather-related) network impairment. However, in another example, the first fault report may relate to a different underlying problem or cause. For instance, a customer may call a service center of the communication network to complain about a poor voice call quality. However, the weather-related network impairment may include a faulty mini-fiber node, which may also be causing an outage of television service for the customer.

At step 360, the processor provides a notification of the weather-related network impairment and an instruction set to resolve the weather-related network impairment. In one example, the instruction set is stored in a solution record associated with the signature for the weather-related network impairment and is retrieved by the processor at step 360. For instance, the instruction set to resolve the weather-related network impairment may be based upon a recordation of a resolution of one or more previous fault reports determined to be associated with the weather-related network impairment. For instance, a network technician dispatched in response to a previous fault report may confirm the nature of the problem underlying the fault report (e.g., the weather-related network impairment) and how the problem was resolved by completing and submitting a form to close the previous fault report. Thus, in one example, the instruction set may comprise the network technician's recordation of how the problem was resolved. Accordingly, in one example, the instruction set may include one or more instructions regarding how to fix or solve the weather-related network impairment. At step 360, the notification of the weather-related network impairment and the instruction set may be provided by the processor to another network technician that is dispatched in response to the first fault report received at step 350. For instance, the notification of the weather-related network impairment and the instruction set may be provided to a mobile device of the network technician being dispatched. Accordingly, the network technician may focus upon a likely cause of the network anomaly (i.e., the weather-related network impairment) and save time and effort by utilizing the instruction set comprising a known set of operations to address the network anomaly and the weather-related network impairment. Following step 360, the method 300 proceeds to step 395 where the method ends.

In addition, although not expressly specified above, one or more steps of method 200 and/or the method 300 may include a storing, displaying and/or outputting step as required for a particular application. In other words, any data, records, fields, and/or intermediate results discussed in the method can be stored, displayed and/or outputted to another device as required for a particular application. Furthermore, operations, steps or blocks in FIG. 2 or FIG. 3 that recite a determining operation or involve a decision do not necessarily require that both branches of the determining operation be practiced. In other words, one of the branches of the determining operation can be deemed as an optional step. Furthermore, operations, steps or blocks of the above described method(s) can be combined, separated, and/or performed in a different order from that described above, without departing from the example embodiments of the present disclosure.

Figure 4:
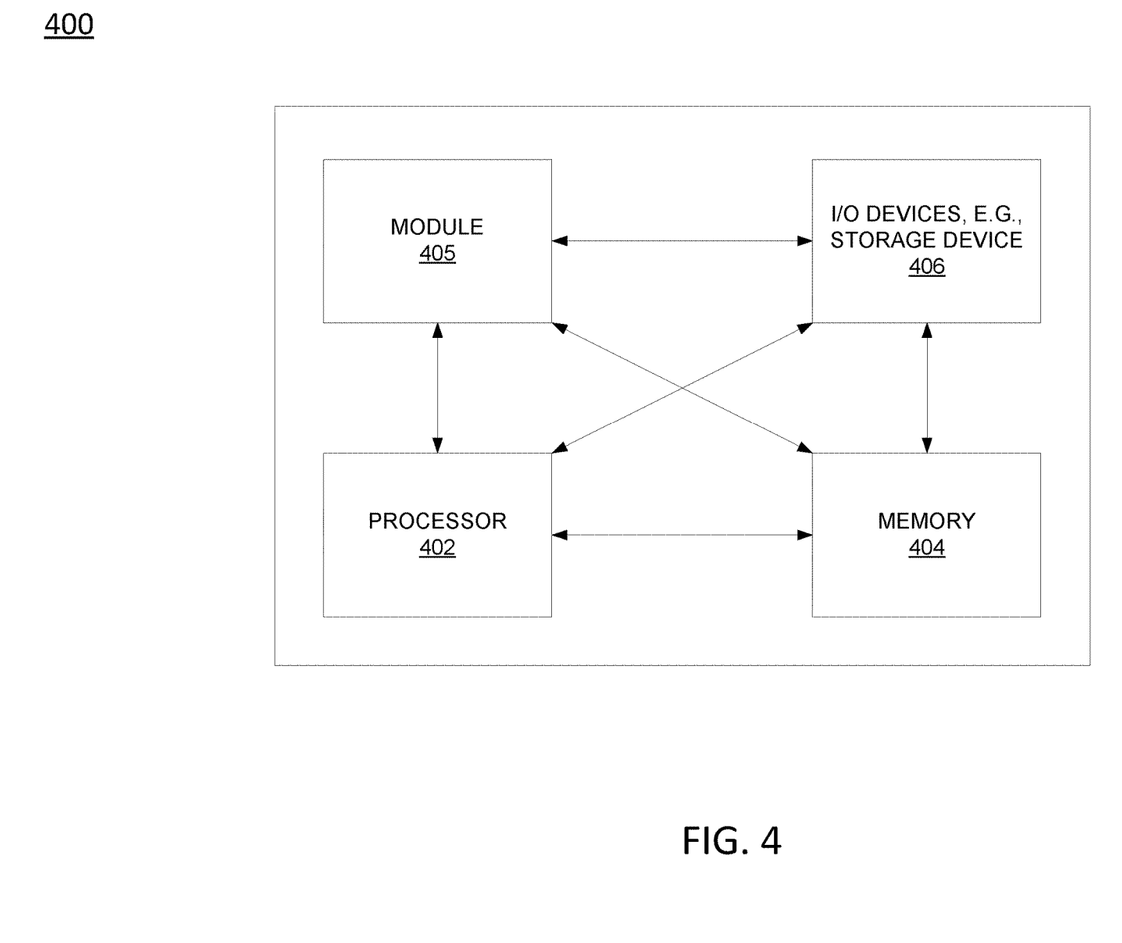
FIG. 4 illustrates a high level block diagram of a computing device specifically programmed to perform the steps, functions, blocks and/or operations described herein.

FIG. 4 depicts a high-level block diagram of a computing device specifically programmed to perform the functions described herein. For example, any one or more components or devices illustrated in FIG. 1 or described in connection with the method 200 or the method 300 may be implemented as the system 400. As depicted in FIG. 4, the system 400 comprises a hardware processor element 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for determining an instruction to resolve a weather-related network impairment or for providing an instruction set to resolve a weather-related network impairment, and various input/output devices 606, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one embodiment, instructions and data for the present module or process 405 for determining an instruction to resolve a weather-related network impairment or for providing an instruction set to resolve a weather-related network impairment (e.g., a software program comprising computer-executable instructions) can be loaded into memory 404 and executed by hardware processor element 402 to implement the steps, functions or operations as discussed above in connection with the example method 200 and/or the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for determining an instruction to resolve a weather-related network impairment or for providing an instruction set to resolve a weather-related network impairment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:
1. A device comprising:
a processor; and
a computer-readable medium storing instructions which, when executed by the processor, cause the processor to perform operations, the operations comprising:
detecting a first occurrence of a network anomaly from a first set of network operational data collected for a portion of a communication network within a first geographic area and for a first time period;

detecting a first occurrence of a weather event from a first set of weather data for the first geographic area and for the first time period;

determining a first occurrence of a weather-related network impairment when the first occurrence of the network anomaly and the first occurrence of the weather event are detected within the first time period, and when the network anomaly and the weather event match a signature for the weather-related network impairment, wherein the signature comprises a deviation from a baseline for network operational data and a deviation from a baseline for weather data;

receiving a first fault report associated with a first customer premises within the geographic area, wherein the first fault report is received within a first time window associated with the first time period; and providing a notification of the weather-related network impairment and an instruction set to resolve the weather-related network impairment, wherein the instruction set is stored in a solution record associated with the signature for the weather-related network impairment.

2. The device of claim 1, wherein the detecting the first occurrence of the network anomaly comprises detecting the deviation from the baseline for the network operational data.

3. The device of claim 2, wherein the deviation is greater than a threshold.

4. The device of claim 1, wherein the detecting the first occurrence of the weather event comprises detecting the deviation from the baseline for the weather data.

5. The device of claim 4, wherein the deviation is greater than a threshold.

6. The device of claim 1, further comprising:
generating the solution record.

7. The device of claim 6, wherein the generating the solution record comprises:

collecting a second set of network operational data of the communication network from a second time period;

determining the baseline for the network operational data from the second set of network operational data;

identifying a second occurrence of the network anomaly comprising the deviation from the baseline for the network operational data;

obtaining a second set of weather data for the second time period;

identifying a second occurrence of the weather event from the second set of weather data, wherein the second occurrence of the weather event comprises the deviation from the baseline for the weather data;

determining that the second occurrence of the network anomaly and the second occurrence of the weather event are associated with a second occurrence of the weather-related network impairment when the second occurrence of the network anomaly and the second occurrence of the weather event are determined to be located in a second geographic area and when a second fault report associated with a second customer premises within the second geographic area is generated within a second time window associated with the second time period;

determining the instruction set to resolve the weather-related network impairment based upon a recordation of a resolution of the second fault report; and storing the solution record comprising the signature for the weather-related network impairment and the instruction set to resolve the weather-related network impairment.

8. The device of claim 7, wherein the recordation of the resolution of the second fault report is provided by a network technician.

9. The device of claim 7, wherein the second time period is prior to the first time period.

10. The device of claim 1, wherein the network operational data comprises:
lack of connectivity data;
intermittent outage data;
power cycle event data for network equipment;
throughput data;
packet loss data;
timeout event data;
signal to noise ratio data; or
signal to noise and interference ratio data.

11. The device of claim 1, wherein the weather data comprises:
precipitation data;
humidity data;
wind speed data;
cloud cover data;
dew point data;
particulate matter data;
temperature data; or
solar event data.

12. The device of claim 1, wherein the weather data is received from a weather service data feed.

13. A non-transitory computer-readable medium storing a plurality of instructions which, when executed by a processor, cause the processor to perform operations, the operations comprising:

detecting a first occurrence of a network anomaly from a first set of network operational data collected for a portion of a communication network within a first geographic area and for a first time period;

detecting a first occurrence of a weather event from a first set of weather data for the first geographic area and for the first time period;

determining a first occurrence of a weather-related network impairment when the first occurrence of the network anomaly and the first occurrence of the weather event are detected within the first time period, and when the network anomaly and the weather event match a signature for the weather-related network impairment, wherein the signature comprises a deviation from a baseline for network operational data and a deviation from a baseline for weather data;

receiving a first fault report associated with a first customer premises within the geographic area, wherein the first fault report is received within a first time window associated with the first time period; and providing a notification of the weather-related network impairment and an instruction set to resolve the weather-related network impairment, wherein the instruction set is stored in a solution record associated with the signature for the weather-related network impairment.

14. The non-transitory computer-readable medium of claim 13, wherein the detecting the first occurrence of the network anomaly comprises detecting the deviation from the baseline for the network operational data.

15. The non-transitory computer-readable medium of claim 13, wherein the detecting the first occurrence of the weather event comprises detecting the deviation from the baseline for the weather data.

16. The non-transitory computer-readable medium of claim 13, further comprising:
   generating the solution record.

17. The non-transitory computer-readable medium of claim 16, wherein the generating the solution record comprises:
   collecting a second set of network operational data of the communication network from a second time period;
   determining the baseline for the network operational data from the second set of network operational data;
   identifying a second occurrence of the network anomaly comprising the deviation from the baseline for the network operational data;
   obtaining a second set of weather data for the second time period;
   identifying a second occurrence of the weather event from the second set of weather data, wherein the second occurrence of the weather event comprises the deviation from the baseline for the weather data;
   determining that the second occurrence of the network anomaly and the second occurrence of the weather event are associated with a second occurrence of the weather-related network impairment when the second occurrence of the network anomaly and the second occurrence of the weather event are determined to be located in a second geographic area and when a second fault report associated with a second customer premises within the second geographic area is generated within a second time window associated with the second time period;
   determining the instruction set to resolve the weather-related network impairment based upon a recordation of a resolution of the second fault report; and
   storing the solution record comprising the signature for the weather-related network impairment and the instruction set to resolve the weather-related network impairment.

18. The non-transitory computer-readable medium of claim 17, wherein the second time period is prior to the first time period.

19. The non-transitory computer-readable medium of claim 13, wherein the weather data is received from a weather service data feed.

20. A method comprising:
   detecting, by a processor, a first occurrence of a network anomaly from a first set of network operational data collected for a portion of a communication network within a first geographic area and for a first time period;
   detecting, by the processor, a first occurrence of a weather event from a first set of weather data for the first geographic area and for the first time period;
   determining, by the processor, a first occurrence of a weather-related network impairment when the first occurrence of the network anomaly and the first occurrence of the weather event are detected within the first time period, and when the network anomaly and the weather event match a signature for the weather-related network impairment, wherein the signature comprises a deviation from a baseline for network operational data and a deviation from a baseline for weather data;
   receiving, by the processor, a first fault report associated with a first customer premises within the geographic area, wherein the first fault report is received within a first time window associated with the first time period; and
   providing, by the processor, a notification of the weather-related network impairment and an instruction set to resolve the weather-related network impairment, wherein the instruction set is stored in a solution record associated with the signature for the weather-related network impairment.

\* \* \* \* \*